United States Patent
Sarpeshkar et al.

(10) Patent No.: US 6,248,856 B1
(45) Date of Patent: Jun. 19, 2001

(54) ONE-SHOT POLYURETHANE ELASTOMERS WITH VERY LOW COMPRESSION SETS

(75) Inventors: Ashok M. Sarpeshkar, Upper St. Clair; Peter H. Markusch, McMurray, both of PA (US); Robert L. Cline, Paden City, WV (US); Corrine M. Gilbert, Aliquippa, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/458,287

(22) Filed: Dec. 10, 1999

(51) Int. Cl.$^7$ ..................................... C08G 18/70
(52) U.S. Cl. ................. 528/67; 528/60; 521/51; 521/159; 521/160
(58) Field of Search .................. 528/67, 60; 521/51, 521/159, 160

(56) References Cited

U.S. PATENT DOCUMENTS

| | | | |
|---|---|---|---|
| 3,635,906 | 1/1972 | Jayawant | 260/77.5 AC |
| 3,644,457 | 2/1972 | König et al. | 260/453 SP |
| 3,806,486 | 4/1974 | Endriss et al. | 260/31.2 N |
| 4,115,429 | 9/1978 | Reiff et al. | 260/453 SP |
| 4,118,411 | 10/1978 | Reiff et al. | 260/453 SP |
| 4,218,543 | 8/1980 | Weber et al. | 521/51 |
| 4,401,804 | 8/1983 | Wooten et al. | 528/272 |
| 4,447,590 | 5/1984 | Szycher | 528/76 |
| 4,523,005 | 6/1985 | Szycher | 528/76 |
| 4,551,498 | 11/1985 | Yeater et al. | 524/424 |
| 4,618,667 | 10/1986 | Kay et al. | 528/49 |
| 4,621,113 | 11/1986 | Collins | 524/196 |
| 5,059,672 | 10/1991 | Engebretson | 528/64 |
| 5,208,315 | 5/1993 | Seneker | 528/67 |
| 5,350,778 | 9/1994 | Steppan et al. | 521/159 |
| 5,563,232 | 10/1996 | Hurley et al. | 528/60 |
| 5,585,452 | 12/1996 | Hurley et al. | 528/67 |
| 5,719,229 | 2/1998 | Pantone et al. | 524/706 |

FOREIGN PATENT DOCUMENTS

| | | |
|---|---|---|
| 971184 | 7/1975 | (CA) . |
| 1196864 | 7/1965 | (DE) . |

*Primary Examiner*—Rachel Gorr
(74) *Attorney, Agent, or Firm*—Joseph C. Gil; N. Denise Brown

(57) ABSTRACT

This invention relates to a process for the production of polyurethane elastomers having low compression sets. The process comprises reacting A) an isocyanate component comprising methylene bis(phenyl isocyanate) containing the 2,4'-isomer of methylene bis(phenyl isocyanate), with B) an isocyanate-reactive component, optionally, in the presence of C) one or more additives. The reaction components are processed via the one-shot process at an isocyanate index of 90 to 130.

22 Claims, No Drawings

ONE-SHOT POLYURETHANE ELASTOMERS WITH VERY LOW COMPRESSION SETS

BACKGROUND OF THE INVENTION

This invention relates to a process for the production of polyurethane elastomers which exhibit low compression sets. These polyurethane elastomers are prepared by the one-shot process, by reacting a methylene diphenyl diisocyanate having a 2,4'-isomer content of at least 20% by weight, with an isocyanate-reactive component having an average functionality of at least 3.0, optionally, in the presence of additives, at an isocyanate index of 90 to 130. It is preferred that the resultant polyurethane elastomers have a compression set of 10% or less.

Liquid room temperature stable polyisocyanates based on 2,4'- and 4,4'-diphenylmethane diisocyanates containing varying amounts of the 2,4'-isomer are known and described in, for example, U.S. Pat. Nos. 4,118,411, 5,350,778, 5,563,232 and 5,585,452. These liquid polyisocyanates are capable of reacting with a suitable polyol component to form molded products via the one-shot process.

The process of molded articles having a closed surface layer by the isocyanate polyaddition process is known. Such articles may be made, for example, by introducing a reactive (optionally, foamable) mixture based on compounds containing several reactive hydrogen atoms and polyisocyanates into a mold (see, e.g., German Auslegeshrift No. 1,196,864). The compounds with reactive hydrogen atoms typically used are polyethers containing hydroxyl groups. Examples of suitable polyisocyanates include 2,4- and 2,6-toluene diisocyanate, their isomeric mixtures and polyphenyl polymethylene polyisocyanates obtained by aniline-formaldehyde condensation followed by phosgenation. Water and/or fluorinated hydrocarbons may be used as blowing agents. Catalysts known to those in the art to be useful for the production of polyurethanes are generally also used.

Depending upon the starting components (and chain lengthening agents such as glycols or diamines if used), it is possible to obtain both elastic and rigid products and variations between these extremes by this procedure. For molded articles that must withstand heavy wear, it is customary to use slightly branched raw materials because such materials yield a product having elastomer-like characteristics. Molded articles of this kind have been produced on a technical scale (e.g., as shoe soles in the shoe manufacturing industry, bowling balls, encapsulations for transformers, self-leveling flooring compositions for gyms, resins for the encapsulation of air bag sensors, etc.).

U.S. Pat. No. 4,774,263 describes a one-shot process for the production of elastic molded articles having a closed surface layer by the reaction injection molding technique without using an external mold release agent. The reaction mixture used in the '263 patent comprises a di- and/or polyisocyanate in which all of the isocyanate groups are aromatically bound, a polyether, a diamine, and, optionally, auxiliary agents and additives.

U.S. Pat. No. 5,719,229 describes polyurethane elastomers having reduced surface skinning and improved green strength prepared by reaction of polyester-based isocyanate prepolymers with diol chain extenders in the presence of certain surface skinning retardants. Various approaches to eliminate surface skinning and improve green strength have been reported. E.g., U.S. Pat. Nos. 3,806,486, 3,635,906, 4,401,804, 4,551,498, and 4,618,667.

U.S. Pat. No. 5,059,672 describes elastomeric reaction products of an aromatic isocyanate, an aliphatic isocyanate having a functionality of at least two, and an aromatic diamine. Suitable aromatic isocyanates include aromatic isocyanates, aromatic isocyanate terminated aliphatics, aromatic isocyanate terminated cycloaliphatics, aromatic isocyanate terminated quasi-prepolymers, and aromatic isocyanate terminated prepolymers. Suitable aliphatic isocyanates include isocyanate terminated aliphatics, cycloaliphatic isocyanates containing at least two isocyanate groups, isocyanate terminated quasi-prepolymers and isocyanate terminated prepolymers. Chain extenders, fillers, pigments, etc., may also be included.

Various polyurethanes and elastomers which may be prepared from an isocyanate, a chain extender and optionally a polyol, in the presence of various catalysts are known and described in, for example, U.S. Pat. Nos. 4,447,590, 4,523,005, 4,621,113 and 5,208,315, and Canadian Patent 971,184. The catalysts described in these references are standard polyurethane catalysts such as, for example, dibutyl tin dilaurate or dibutyl tin oxide.

U.S. Pat. No. 4,115,429 describes low temperature, stable liquid diphenylmethane diisocyanates which are useful isocyanate components in the manufacturing of one-shot polyurethane elastomers. Also, see U.S. Pat. No. 3,644,457 in this regard.

Low compression set polyurethane elastomers are specifically useful in gasket applications and other applications where dynamic mechanical properties are required, i.e., shock absorbers. Very low compression set polyurethanes can usually only be obtained by the so called "hot cast elastomer process" where isocyanate prepolymers based on MDI with very low NCO content (usually less than 10%) are reacted at elevated temperatures (i.e., 80° C.) with a chain extender (i.e., 1,4-butanediol). The hot melt cast elastomer process does not only require high temperatures but is also expensive and demands equipment with very high accuracy to mix the components due to mix ratios ranging from 90:10 to even 95:5. The one-shot process on the other hand, can be performed at ambient temperatures and allows more robust mix ratios of about 1:1 to about 1:3. However, polyurethane made by the one-shot process as known by the art have not shown the desirable low compression set.

SUMMARY OF THE INVENTION

This invention relates to a process for the production of polyurethane elastomers having low compression sets. This process comprises reacting A) an isocyanate component with B) an isocyanate-reactive component, optionally in the presence of C) one or more additives, with the components being processed via the one-shot process at an isocyanate index of 90 to 130, preferably 95 to 110. It is preferred that the resultant polyurethane elastomers of this process have a compression set of less than 10%.

Component A) the isocyanate component comprises: A)1) 20 to 100% by weight, preferably from 30 to 95% by weight and more preferably from 25 to 85% by weight, of methylene bis (phenyl isocyanate) comprising: (a) from 20 to 80% by weight of 4,4'-methylene bis(phenyl isocyanate); (b) from 20 to 80% by weight of 2,4'-methylene bis(phenyl isocyanate); and (c) from 0.1 to 5% by weight of 2,2'-methylene bis(phenyl isocyanate), with the percents by weight of components A)1)(a), A)1)(b) and A)1)(c) totaling 100% by weight of component A)1). Component A) additionally comprises: A)2) from 0 to 80% by weight, preferably from 5 to 70% by weight, and more preferably from 15 to 75% by weight, of an isocyanate-reactive compound containing two hydroxyl groups and having a molecular weight of 62 to 6,000, preferably 200 to 6,000, and most preferably 200 to 2,000. The percents by weight of components A)1) and A)2) total 100% by weight of component A). In the embodiment wherein A) the isocyanate component comprises an isocyanate prepolymer which is prepared by reacting A)1) with A)2), it is preferred that these prepolymers have an NCO group content of about 8 to about 23%, a functionality of about 2.0, a urethane content of about 2 to about 15%, preferably about 2 to about 10%, and a viscosity of 400 to 5,000 mPa·s at 25° C.

Component B), the isocyanate-reactive component comprises: B)1) from 40 to 80% by weight, preferably from 40 to 70% by weight and more preferably from 40 to 60% by weight, based on 100% by weight of component B), of an isocyanate-reactive component containing hydroxyl and/or amine groups, and having a molecular weight of more than 1,000 (preferably of from 2,000 to 6,000), and a functionality of about 3 to about (preferably about 3); B)2) from 10 to 40% by weight, preferably from 10 to 30% by weight and more preferably from 10 to 20% by weight, based on 100% by weight of component B), of an isocyanate-reactive component containing from about 3 to about 5 hydroxyl-groups, and having a molecular weight of about 800 or less (preferably about 130 to 600); and B)3) from 5 to 40% by weight, preferably from 5 to 20% by weight and more preferably from 5 to 10% by weight, based on 100% by weight of component B), of an isocyanate-reactive component containing about 2 hydroxyl groups, and having a molecular weight of from about 62 to about 200. Components A) and B) may be reacted in the presence of C) one or more additives.

This invention also relates to a polyurethane elastomer, preferably having a compression set of less than 10%, which comprises:

A) an isocyanate component comprising:
   1) 20 to 100% by weight, based on 100% by weight of component A), of methylene bis(phenyl isocyanate) comprising:
      (a) from 20 to 80% by weight of 4,4'-methylene bis(phenyl isocyanate),
      (b) from 20 to 80% by weight of 2,4'-methylene bis(phenyl isocyanate),
      (c) from 0.1 to 5% by weight of 2,2'-methylene bis(phenyl isocyanate),
      with the percents by weight of components A)1)(a), A)1)(b) and A)1)(c) totaling 100% by weight of component A)1),
   and
   2) from 0 to 80% by weight, based on 100% by weight of component A), of an isocyanate-reactive compound containing two hydroxyl groups and having a molecular weight of 62 to 6,000;
B) a polyol component comprising:
   1) from 40 to 80% by weight, based on 100% by weight of component B), of an isocyanate-reactive component containing hydroxyl and/or amine groups, and having a molecular weight of more than 1,000, and a functionality of about 3 to about 5,
   2) from 10 to 40% by weight, based on 100% by weight of component B), of an isocyanate-reactive component containing from about 3 to about 5 hydroxyl-groups and having a molecular weight of about 800 or less,
   and
   3) from 5 to 40% by weight, based on 100% by weight of component B), of an isocyanate-reactive component containing about 2 hydroxyl groups, and having a molecular weight of from about 62 to 200;

and, optionally,
   C) one or more additives,
wherein the components are processed via the one-shot process at an isocyanate index of 90 to 130.

DETAILED DESCRIPTION OF THE INVENTION

Suitable isocyanates to be used as component A) of the present invention comprise A)1) methylene bis(phenyl isocyanate) mixtures containing (a) from 20 to 80% by weight, preferably from 30 to 80% by weight, and most preferably from 35 to 55% by weight of 4,4'-methylene bis(phenyl isocyanate); (b) from 20 to 80% by weight, preferably from 40 to 70% by weight, and most preferably from 45 to 65% by weight of 2,4'-methylene bis(phenyl isocyanate); and (c) from 0.1 to 5%, preferably from 0.1 to 2.0% by weight, and most preferably from 0.5 to 2.0% by weight of 2,2'-methylene bis(phenyl isocyanate), with the %'s by weight of A)1)(a), A)1)(b) and A)1)(c) totaling 100% by weight of A)1).

In accordance with the present invention, it is also possible that component A) comprises an isocyanate prepolymer. Suitable prepolymers comprise the reaction product of A)1) a methylene bis(phenyl isocyanate) mixture as described above, with A)2) an isocyanate-reactive component in a ratio such that the resultant product contains isocyanate groups. These isocyanate prepolymers are the reaction products of A)1) with A)2), and comprise from 20 to 100%, preferably from 30 to 95% and more preferably from 25 to 85% by weight of A)1) a methylene bis(phenyl isocyanate) mixture comprising (a), (b) and (c) described above; and from 0 to 80%, preferably from 5 to 75%, and more preferably from 15 to 70% by weight of A)2) an isocyanate-reactive component, wherein the percents by weight of component A)1) and A)2) totals 100% by weight of component A).

Suitable isocyanate-reactive components to be used as component A)2) of the present invention for forming the isocyanate prepolymer include, for example, compounds containing two hydroxyl groups capable of reacting with isocyanate-groups of component A)1), have an OH number of from about 18 to 1806 (preferably from about 28 to about 750), and a molecular weight of from about 62 to about 6,000 (preferably of from about 200 to about 2,000). Examples of suitable compounds include, but are not limited to, ethylene glycol, diethylene glycol, dipropylene glycol, triethylene glycol, tripropylene glycol, tetrapropylene glycol, neopentyl glycol, trimethylpentane diol, etc., as well as higher molecular weight alkoxylation adducts of suitable initiator compounds including, for example, ethylene glycol, diethylene glycol, dipropylene glycol, triethylene glycol, tripropylene glycol, tetrapropylene glycol, neopentyl glycol, trimethylpentane diol, etc., which are commonly referred to polyether polyols, with polyether diols having molecular weights of 500 to 6,000 being preferred, and those having molecular weights of about 1,000 to about 4,000 being more preferred. Preferred hydroxyl-group containing compounds to be used as component A)2) are diethylene glycol, dipropylene glycol, tripropylene glycol and trimethylpentane diol, as well as polyether diols having molecular weights of 1,000 to 4,000.

It is particularly preferred that an isocyanate prepolymer having an NCO group content of about 10% be used as component A), wherein component A)2) comprises a polyether diol. Isocyanate prepolymers such as these result in the lowest compression set in the resultant polyurethane elastomers of the present invention.

Component B) the isocyanate-reactive component of the present invention comprises 1) from 40 to 80% by weight, preferably 40 to 70% by weight, and more preferably 40 to 60% by weight, based on 100% by weight of component B), of an isocyanate-reactive component having a molecular weight of more than about 1,000, preferably from about 2,000 to about 6,000, more preferably from about 3,000 to about 6,000, and having a functionality of about 3 to about 5, and preferably about 3. Such compounds may contain hydroxyl groups, amine groups or a mixture thereof, provided that the total number of isocyanate-reactive groups present satisfies the above functionality requirements. Examples of suitable compounds to be used as component B)1) include the polyethers, polyesters, polythioethers, polyacetals, polycarbonates, and amine terminated polyethers containing from about 3 to about 5 isocyanate-reactive groups of the type known for the production of polyurethanes.

The high molecular weight polyethers suitable for use in accordance with the invention are known and may be obtained, for example, by polymerizing tetrahydrofuran or epoxides such as, for example, ethylene oxide, propylene oxide, butylene oxide, styrene oxide or epichlorohydrin in the presence of suitable catalysts, such as, for example, $BF_3$ or KOH, or by chemically adding these epoxides, preferably, ethylene oxide and propylene oxide, in admixture or successively to components containing reactive hydrogen atoms such as alcohols or amines. Examples of suitable alcohols and amines include the low molecular weight chain extenders set forth hereinafter, glycerin, triethanolamine, trimethylolpropane, sucrose, ethanolamine, and ethylene diamine. It is preferred to use polyethers which contain substantial amounts of primary hydroxyl groups in terminal positions (greater than 80% by weight, based on all of the terminal hydroxyl groups present in the polyether).

Polyether polyols are preferably used as component B)1) in the invention. Preferred polyethers include, for example, those compounds based on tri-functional starters such as, for example, glycerin, trimethylolpropane, triethanolamine or ethanolamine.

Suitable polyesters, polythioethers, polyacetals, polycarbonates and other polyhydroxyl compounds which may be used in accordance with the invention may be found, for example, in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Also suitable are so-called amine terminated polyethers containing primary or secondary aromatically or aliphatically bound amino groups, wherein amino end groups can also be attached to the polyether chain through urethane or ester groups. It is preferred that the amine-terminated polyethers have a molecular weight in the range of from 1,000 to 6,000 and a functionality of 3 or higher. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). The preparation of polyethers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Processes for the production of useful amine terminated polyethers using isocyanate hydrolysis techniques are described in U.S. Pat. Nos. 4,386,218, 4,456,730, 4,472,568, 4,501,873, 4,515,923, 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266, 4,532,317, 4,723,032, 4,724,252, 4,855,504 and 5,283,364.

The amine terminated polyethers used in the present invention are in many cases mixtures with any of the above-mentioned compounds.

In another embodiment, the polyhydroxyl compound B)1) may additionally comprise: i) a dispersion of a polyurea and/or polyhydrazodicarbonamide in a relatively high molecular weight organic compound containing at least two hydroxyl groups; ii) a polymer polyol prepared by polymerizing an ethylenically unsaturated monomer or monomers in a relatively high molecular weight organic compound containing at least two hydroxyl groups; or iii) blends thereof. It is possible to use these types of polyols either alone, or in conjunction with the conventional polyethers described hereinabove.

These types of polyols are known, and can be characterized as hydroxyl containing compounds which contain high molecular weight polyadducts, polycondensates, or polymers in finely dispersed or dissolved form. Such polymers may be obtained by polyaddition reactions (for example, reactions between polyisocyanates and aminofunctional compounds) and polycondensation reactions (for example, between formaldehyde and phenols and/or amines) in situ in the hydroxyl group containing compound. Such processes are described in, for example, German Auslegeschriften 1,168,075 and 1,260,142, the disclosures of which are herein incorporated by reference, and in German Offenlegungsschriften 2,324,134, 2,423,984, 2,512,385, 2,513,815, 2,550,796, 2,550,797, 2,550,833, 2,550,862, 2,633,293, and 2,639,254, the disclosures of which are herein incorporated by reference. See also U.S. Pat. Nos. 3,325,421, 4,042,537, 4,089,835, 4,293,470, 4,296,213, 4,374,209, and 4,786,706, the disclosures of which are herein incorporated by reference. Polyols of this type are commercially available from Bayer Corporation and Bayer AG. Also useful are the so-called polymer polyols obtained by polymerizing one or more ethylenically unsaturated monomers in a hydroxy group containing compound. Polyols modified by vinyl polymers, of the type formed, for example, by polymerizing styrene or acrylonitrile in the presence of polyether polyol are also suitable, as are polybutadienes containing OH groups. Such polymer polyols are described in U.S. Pat. Nos. 3,383,351, 3,304,273, 3,523,093, 3,110,685, and RE 28,715 and 29,118, and German Patent 1,152,536, the disclosures of which are herein incorporated by reference. Polymer polyols are commercially available from Bayer AG, BASF, and Union Carbide.

Suitable compounds to be used as component B)2) in the present invention include, for example, isocyanate-reactive compounds containing on average 3 to 5 hydroxyl-groups and having a molecular weight of about 800 or less, preferably of about 130 to about 600. Some examples of suitable compounds include pentaerythritol, trimethylolpropane, glycerol, mixtures thereof, and other tri- and/or tetra- and/or penta-functional polyethers, and tri- and/or tetra-and/or penta-functional polyesters, such as, for example, polycaprolactone triols. Suitable tri-, tetra- and/or penta-functional polyethers include, for example, compounds prepared by the alkoxylation (preferably, ethoxylation and/or propoxylation) of glycerol, trimethylolpropane, pentaerythritol, monoethanolamine, and other tri- or tetra- or penta-functional starter compounds, provided that the above mentioned molecular weight limits are satisfied. It is, of course, also possible to use mixtures of the above identified tri- and tetra-functional compounds or mixtures of other starter compounds may be used as component B)2) or as a starter for preparing polyethers to be used as component B)2) provided that the molecular weight and functionality requirements described above are satisfied. Preferred compounds to be used as component B)2) include trifunctional polyethers prepared by alkoxylation of glycerol, trimethylolpropane and ethanolamine.

Suitable compounds to be used as component B)3) of the present invention include those isocyanate-reactive compounds containing about 2 hydroxyl groups and having a molecular weight in the range of from about 62 to about 200. Some examples of these suitable compounds include, but are not limited to, 2-methyl-1,3-propanediol, ethylene glycol, 1,2- and 1,3-propanediol, 1,3- and 1,4- and 2,3-butanediol, 1,6-hexanediol, 1,10-decanediol, diethylene glycol, triethylene glycol, tetraethylene glycol, dipropylene glycol, tripropylene glycol, neopentyl glycol, cyclohexanedimethanol, 2,2,4-trimethylpentane-1,3- diol, etc. Preferred diols include, for example, 1,4-butanediol, dipropylene glycol, and diethylene glycol.

In accordance with the present invention, components A) and B) are present in amounts such that the isocyanate index (NCO Index) of the reaction mixture is from about 90 to about 130, preferably from about 95 to about 110, and most preferably from about 100 to about 105. The term "Isocyanate Index" as used herein is defined as the equivalents of isocyanate which are reacted with 100 equivalents of isocyanate-reactive hydrogen containing materials.

Suitable additives to be used as component C) in the present invention include, for example, catalysts, surface-active additives, such as, emulsifiers. Some examples of suitable catalysts include the tertiary amines, organometallic compounds, particularly organotin catalysts, such as, for example, tin carboxylates and bismuth carboxylates, tin-sulfur catalysts, etc. Examples include N-stearyl-N',N'-bis-(hydroxyethyl)urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid, such as, dodecyl benzene sulfonic acid or dinaphthyl methane sulfonic acid and also fatty acids may also be used as surface-active additives.

Suitable anti-oxidants include, for example, Irganox 245, and suitable UV stabilizers include, for example, Tinuvin 765. However, any of the known anti-oxidants and/or UV stabilizers may be used. As set forth hereinabove, specific advantages have been found in reaction mixtures containing anti-oxidants and/or UV stabilizers. It is preferred that a stabilizer selected from the group consisting of anti-oxidants, UV-stabilizers, hindered amine light stabilizers, and mixtures thereof is added to the mixture containing isocyanate-reactive components.

It is also possible to use the known internal mold release agents, such as, for example, zinc stearate, in the RIM process of the invention. This IMR is described in U.S. Pat. Nos. 4,269,945 and 4,585,803, the disclosures of which are herein incorporated by reference, and in Canadian Patent 1,180,146.

Pigments may also be added to the B-side of the reaction mixture. Usually when pigments are added, they are typically dispersed in a hydroxyl group containing compound (such as, for example, a polyether, a polyester, or a chain extender, etc.). When this is done, the weight of the hydroxyl group containing compound is considered in determining the percent by weight of components B)1), B)2) and B)3) as set forth hereinabove. In addition, it is also possible to include additives, such as, for example, viscosity depressants, surfactants, and plasticizers in one of the components.

In preparing polyurethanes according to the present invention, the isocyanate and the isocyanate-reactive components, both maintained at ambient or slightly elevated temperature, are mixed until a homogenous mixture is obtained. The mix ratio is chosen so that the most preferred index is achieved. Mixing of the two components may be achieved by employing either a two- or three-stream machine capable of metering the components accurately. The reacting mixture is poured into a suitable mold and cured completed at ambient or an elevated temperature in an oven. After the material has solidified, it may be demolded and allowed to further post-cure at either ambient or elevated temperature.

Prior to mixing with the isocyanate, the isocyanate-reactive component is prepared by blending the individual components described in the invention with the optional catalyst, filler and other additives. It is preferable to degas this mixture, especially when inorganic fillers are employed.

As used herein, the term "molecular weight" refers to the number average molecular weight as determined by end-group analysis.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following components were used in the working examples:

Polyol 1: a glycerol started propylene oxide/ethylene oxide (87:13 wt. ratio) polyether polyol, having an OH number of about 35, a functionality of about 3 and a molecular weight of about 4800

Polyol 2: a propylene glycol started propylene oxide (100%) polyether polyol, having an OH number of about 112, a functionality of about 2 and a molecular weight of about 1000

Polyol 3: a trimethylolpropane started propylene oxide (100%) polyether polyol, having an OH number of about 370, a functionality of about 3 and a molecular weight of about 450

Polyol 4: a propylene glycol started propylene oxide/ ethylene oxide (80:20 wt. ratio) polyether polyol, having an OH number of about 28, a functionality of about 2 and a molecular weight of about 4000

Polyol 5: 1,4-butanediol

Baylith L Paste: a mixture of a synthetic alumino-silicate in castor oil

Dow Corning Antifoam 1500: 100% silica-filled polydimethyl siloxane, an FDA approved antifoaming agent used to prevent foam in food and chemical processes Catalyst A: a dibutyltin dilaurate catalyst, commercially available as Dabco T-12 from Air Products and Chemical Inc. Allentown, Pa.

Isocyanate A: diphenylmethane diisocyanate having an isomer distribution comprising 44% by weight of the 4,4'-isomer, 54% by weight of the 2,4'-isomer and about 2% by weight of the 2,2'-isomer. This diisocyanate has an NCO content of about 33.6%, a functionality of about 2.0 and a viscosity of less than about 25 mPa·s at 25° C.

Isocyanate B: 4,4'-diphenylmethane diisocyanate having an NCO content of about 33.6%, a functionality of about 2.0 and a viscosity of less than about 25 mPa·s at 25° C.

Isocyanate C: an isocyanate prepolymer having an NCO group content of about 23% and a viscosity of about 400–700 mPa·s at 25° C., comprising the reaction product of about 86.8% by weight of Isocyanate A and about 13.2% by weight of tripropylene glycol Isocyanate D: an isocyanate prepolymer having an NCO group content of about 23%, a viscosity of between about 500 and about 800 mPa·s at 25° C. and comprising the reaction product of about 86.8% by weight of Isocyanate B and about 13.2% by weight of tripropylene glycol Isocyanate E: an isocyanate prepolymer having an NCO group about 27.5% by weight of Isocyanate A, about 10% by weight of Isocyanate B, and about 62.5% by weight of Polyol 1

The following polyol blends were used in the examples:

| Polyol Blend A comprised: | 63.53 pbw Polyol 1 |
|---|---|
| | 18.18 pbw Polyol 3 |
| | 9.09 pbw Polyol 5 |
| | 9.09 pbw Baylith Paste L |
| | 0.10 pbw Dow Corning Antifoam 1500 |
| | 0.005 pbw Catalyst A |

Polyol Blend A was characterized by an equivalent weight of 267 and a functionality of 2.33.

| Polyol Blend B comprised: | 52.43 pbw Polyol 2 |
|---|---|
| | 28.23 pbw Polyol 4 |
| | 10.08 pbw Polyol 5 |
| | 9.07 pbw Baylith Paste L |
| | 0.13 pbw Dow Corning Antifoam 1500 |
| | 0.005 pbw Catalyst A |

Polyol Blend B was characterized by an equivalent weight of 281 and a functionality of 2.0.

| Polyol Blend C comprised: | 47.19 pbw Polyol 2 |
|---|---|
| | 25.41 pbw Polyol 4 |
| | 18.15 pbw Polyol 5 |
| | 9.07 pbw Baylith Paste L |
| | 0.13 pbw Dow Corning Antifoam 1500 |
| | 0.005 pbw Catalyst A |

Polyol Blend C was characterized by an equivalent weight of 191 and a functionality of 2.0.

The polyurethane castings in Examples 1–9, as set forth in Tables 1 and 2, were prepared according to the following procedure:

The polyol blend and the isocyanate were hand mixed at 25–30° C. for 1.5–2.0 minutes, and then cast into a 105–110° C. book-case mold which measured 8 in.×16 in.×0.125 in. and into button molds (also pre-heated to 105–110° C.). (One button mold was used for each example.) The cast samples were allowed to cure at 105–110° C. in the molds for 16 hours, before being demolded. After I week at room temperature, the samples were tested for various physical and mechanical properties. The results are set forth in Tables 1 and 2 below.

TABLE 1

Examples 1–3: 2,4'-rich MDI with decreasing NCO group contents
Example 4: Comparative
Example 5: decreasing 2,4'-isomer content of Example 2

| | Example 1 | Example 2 | Example 3 | Example 4 | Example 5 |
|---|---|---|---|---|---|
| Polyol Blend A (grams) | 230 | 200 | 132 | 230 | 200 |
| Isocyanate A (grams) | 112.9 | | | | |
| Isocyanate C (grams) | | 141.1 | | | 71.5 |
| Isocyanate E (grams) | | | 220 | | |
| Isocyanate B (grams) | | | | 112.9 | |
| Isocyanate D (grams) | | | | | 71.5 |
| NCO:OH Ratio | 1.05 | 1.05 | 1.05 | 1.05 | 1.05 |
| Compression Set (%) | 5.13 | 1.83 | 0.37 | 12.9 | 4.1 |
| Tensile Strength (psi) | 1072 | 3222 | 362 | 1644 | 2536 |
| 100% Modulus (psi) | 334 | 1552 | 199 | 981 | 1970 |
| Elongation (%) | 249 | 280 | 212 | 188 | 227 |
| Die C Tear (pli) | 97 | 219 | 88 | 154 | 254 |
| Taber Abrasion (wt. loss in mg/1000 cycles) | 273 | 295 | 131 | 328 | 248 |
| Hardness Shore A (1 sec/5 sec) | 63/60 | 89/86 | 51/51 | 85/83 | 91/86 |

TABLE 2

Examples Using a Linear Polyol Blend: Examples 6–9 are comparative

| | Example 6 | Example 7 | Example 8 | Example 9 |
|---|---|---|---|---|
| Polyol Blend B (grams) | 208 | 208 | | |
| Polyol Blend C (grams) | | | 1776 | 176 |
| Isocyanate C (grams) | 140.2 | | 174.4 | |

TABLE 2-continued

Examples Using a Linear Polyol Blend: Examples 6–9 are comparative

|  | Example 6 | Example 7 | Example 8 | Example 9 |
|---|---|---|---|---|
| Isocyanate D (grams) |  | 142 |  | 176.6 |
| NCO:OH Ratio | 1.05 | 1.05 | 1.05 | 1.05 |
| Compression Set (%) | 42 | 25 | 79 | 48 |
| Tensile Strength (psi) | 1691 | 2178 | 3224 | 3292 |
| 100% Modulus (psi) | 281 | 687 | 1197 | 2299 |
| Elongation (%) | 493 | 358 | 363 | 271 |
| Die C Tear (pli) | 177 | 263 | 461 | 447 |
| Taber Abrasion (wt. loss in mg/1000 cycles) | 230 | 214 | 252 | 162 |
| Hardness Shore A (1 sec/5 sec) | 65/58 | 78/75 | 88/81 | 89/88 |

The polyurethane castings in Examples 10–11, as set forth in Table 3, were prepared according to the following procedure:

The polyol blend and the isocyanate were hand mixed at 25–30° C. for 1.5–2.0 minutes, and then cast into a room temperature book-case mold which measured 8 in.×16 in.× 0.125 in., and into room temperature (i.e. 25–30° C.) button molds. (One button mold was used for each example.) The cast samples were left in the molds and allowed to remain there for 4 days at room temperature before demolding. Each sample was then post-cured at 100° C. for 16 hours. The samples were then post-cured for an additional 7 days (i.e. 1 week) at room temperature, before being tested for various physical and mechanical properties. The results are set forth in Table 3 below.

Example 10 is representative of the present invention and Example 11 is comparative.

TABLE 3

|  | Example 10 | Example 11 |
|---|---|---|
| Polyol Blend A (grams) | 225 | 225 |
| Isocyanate C (grams) | 159 |  |
| Isocyanate D (grams) |  | 163.9 |
| Post Cure | 100° C. | 100° C. |
| NCO:OH Ratio | 1.05 | 1.05 |
| Compression Set (%) | 5.4 | 18.34 |
| Tensile Strength (psi) | 1881 | 2026 |
| 100% Modulus (psi) | 527 | 1741 |
| Elongation (%) | 260 | 123 |
| Die C Tear (pli) | 158 | 199 |
| Taber Abrasion (wt. loss in mg/1000 cycles) | 233 | 142 |
| Hardness Shore A (1 sec/5 sec) | 84/75 | 89/86 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a polyurethane elastomer having a low compression set, comprising reacting:
   A) an isocyanate component comprising:
      1) 20 to 100% by weight, based on 100% by weight of component A), of methylene bis(phenyl isocyanate) comprising:
         (a) from 20 to 80% by weight of 4,4'-methylene bis(phenyl isocyanate),
         (b) from 20 to 80% by weight of 2,4'-methylene bis(phenyl isocyanate),
         (c) from 0.1 to 5% by weight of 2,2'-methylene bis(phenyl isocyanate),
         with the percents by weight of components A)1)(a), A)1)(b) and A)1)(c) totaling 100% by weight of component A)1),
      and
      2) from 0 to 80% by weight, based on 100% by weight of component A), of an isocyanate-reactive compound containing two hydroxyl groups and having a molecular weight of 62 to 6,000;
   B) an isocyanate-reactive component comprising:
      1) from 40 to 80% by weight, based on 100% by weight of component B), of an isocyanate-reactive component containing hydroxyl and/or amine groups, and having a molecular weight of more than 1,000, and a functionality of about 3 to about 5,
      2) from 10 to 40% by weight, based on 100% by weight of component B), of an isocyanate-reactive component containing from about 3 to about 5 hydroxyl-groups, and having a molecular weight of about 800 or less;
      and
      3) from 5 to 40% by weight, based on 100% by weight of component B), of an isocyanate-reactive component containing about 2 hydroxyl groups, and having a molecular weight of from about 62 to about 200;
      and, optionally,
   C) one or more additives,
   wherein the components are processed via the one-shot process at an isocyanate index of 90 to 130.

2. The process of claim 1, wherein the resultant polyurethane elastomer is characterized by a compression set of less than about 10%.

3. The process of claim 1, wherein A) said isocyanate component comprises a prepolymer having an NCO group content of about 8 to about 23%, a functionality of about 2, a urethane content of about 2 to 15% and a viscosity of about 400 to about 5,000 mPa·s at 25° C., and comprises the reaction product of A)1) and A)2).

4. The process of claim 3, wherein:
   A)1) comprises from 30 to 95% by weight of methylene bis(phenyl isocyanate),
   and
   A)2) comprises from 5 to 70% by weight of an isocyanate-reactive compound containing two hydroxyl groups and having a molecular weight of 200 to 6,000.

5. The process of claim 3, wherein A)1) said methylene bis(phenyl isocyanate) comprises
   (a) from 30 to 80% by weight of 4,4'-methylene bis (phenyl isocyanate),
   (b) from 20 to 70% by weight of 2,4'-methylene bis (phenyl isocyanate),
   and
   (c) from 0.1 to 2.0% by weight of 2,2'-methylene bis (phenyl isocyanate), with the %'s by weight of A)1)(a), A)1)(b) and A)1)(c) totaling 100% by weight of A)1).

6. The process of claim 3, wherein A)1) said methylene bis(phenyl isocyanate) comprises
   (a) from 35 to 55% by weight of 4,4'-methylene bis (phenyl isocyanate),
   (b) from 45 to 65% by weight of 2,4'-methylene bis (phenyl isocyanate), and
   (c) from 0.5 to 2.0% by weight of 2,2'-methylene bis (phenyl isocyanate),
with the %'s by weight of A)1)(a), A)1)(b) and A)1)(c) totaling 100% by weight of A)1).

7. The process of claim 1, wherein component B)1) has a molecular weight of from about 2,000 to about 6,000 and a functionality of about 3.

8. The process of claim 1, wherein component B)2) has a molecular weight of about 130 to about 600 and a functionality of about 3.

9. The process of claim 1, wherein the resultant polyurethane elastomer is post cured at a temperature of 80° C. or higher.

10. The process of claim 1, wherein the resultant polyurethane elastomer is post cured at a temperature of 100° C. or higher.

11. The process of claim 1, wherein the isocyanate index is 95 to 110.

12. A polyurethane elastomer having a low compression set, and which comprises:
    A) an isocyanate component comprising:
       1) 20 to 100% by weight, based on 100% by weight of component A), of methylene bis(phenyl isocyanate) comprising:
          (a) from 20 to 80% by weight of 4,4'-methylene bis(phenyl isocyanate),
          (b) from 20 to 80% by weight of 2,4'-methylene bis(phenyl isocyanate),
          (c) from 0.1 to 5% by weight of 2,2'-methylene bis(phenyl isocyanate),
             with the percents by weight of components A)1)(a), A)1)(b) and A)1)(c) totaling 100% by weight of component A)1); and
       2) from 0 to 80% by weight, based on 100% by weight of component A), of an isocyanate-reactive compound containing two hydroxyl groups and having a molecular weight of 62 to 6,000;
    B) an isocyanate-reactive component comprising:
       1) from 40 to 80% by weight, based on 100% by weight of component B), of an isocyanate-reactive component containing hydroxyl and/or amine groups, and having a molecular weight of more than 1,000, and a functionality of about 3 to about 5,
       2) from 10 to 40% by weight, based on 100% by weight of component B), of an isocyanate-reactive component containing from about 3 to about 5 hydroxyl-groups and having a molecular weight of about 800 or less, and
       3) from 5 to 40% by weight, based on 100% by weight of component B), of an isocyanate-reactive component containing about 2 hydroxyl groups, and having a molecular weight of from about 62 to 200;
       and, optionally,
    C) one or more additives,
wherein the components are processed via the one-shot process at an isocyanate index of 90 to 130.

13. The polyurethane elastomer of claim 12, which is characterized by a compression set of less than about 10%.

14. The polyurethane elastomer of claim 12, wherein A) said isocyanate component comprises a prepolymer having an NCO group content of about 8 to about 23%, a functionality of about 2, a urethane content of about 2 to 15% and a viscosity of about 400 to about 5,000 mPa·s at 25° C., and comprises the reaction product of A)1) and A)2).

15. The polyurethane elastomer of claim 14, wherein:
    A)1) comprises from 30 to 95% by weight of methylene bis(phenyl isocyanate), and
    A)2) comprises from 5 to 70% by weight of an isocyanate-reactive compound containing two hydroxyl groups and having a molecular weight of 200 to 6,000.

16. The polyurethane elastomer of claim 14, wherein A)1) said methylene bis(phenyl isocyanate) comprises:
    (a) from 30 to 80% by weight of 4,4'-methylene bis (phenyl isocyanate),
    (b) from 20 to 70% by weight of 2,4'-methylene bis (phenyl isocyanate), and
    (c) from 0.1 to 2.0% by weight of 2,2'-methylene bis (phenyl isocyanate),
with the %'s by weight of A)1)(a), A)1)(b) and A)1)(c) totaling 100% by weight of A)1).

17. The polyurethane elastomer of claim 14, wherein A)1) said methylene bis(phenyl isocyanate) comprises:
    (a) from 35 to 55% by weight of 4,4'-methylene bis (phenyl isocyanate),
    (b) from 45 to 65% by weight of 2,4'-methylene bis (phenyl isocyanate), and
    (c) from 0.5 to 2.0% by weight of 2,2'-methylene bis (phenyl isocyanate),
with the %'s by weight of A)1)(a), A)1)(b) and A)1)(c) totaling 100% by weight of A)1).

18. The polyurethane elastomer of claim 12, wherein component B)1) has a molecular weight of from about 2,000 to about 6,000 and a functionality of about 3.

19. The polyurethane elastomer of claim 12, wherein component B)2) has a molecular weight of about 130 to about 600 and a functionality of about 3.

20. The polyurethane elastomer of claim 12, wherein the resultant polyurethane elastomer is post cured at a temperature of 80° C. or higher.

21. The polyurethane of claim 12, wherein the resultant polyurethane elastomer is post cured at a temperature of 100° C. or higher.

22. The polyurethane elastomer of claim 12, wherein the isocyanate index is 95 to 110.

* * * * *